United States Patent
Bealkowski et al.

(10) Patent No.: US 6,330,656 B1
(45) Date of Patent: Dec. 11, 2001

(54) PCI SLOT CONTROL APPARATUS WITH DYNAMIC CONFIGURATION FOR PARTITIONED SYSTEMS

(75) Inventors: Richard Bealkowski, Redmond, WA (US); Patrick M. Bland, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/283,363

(22) Filed: Mar. 31, 1999

(51) Int. Cl.[7] ................................................ G06F 13/14
(52) U.S. Cl. ........................ 712/13; 709/226; 710/13; 710/103; 710/36
(58) Field of Search .......................... 712/13; 709/226; 710/12, 103, 13, 41, 36

(56) References Cited

U.S. PATENT DOCUMENTS 6,247,109 * 6/2001 Kleinsorge et al. ................... 712/13

* cited by examiner

*Primary Examiner*—Kenneth R. Coulter
(74) *Attorney, Agent, or Firm*—Bracewell & Patterson, LLP

(57) ABSTRACT

A system for partitioning and allocating individual PCI slots within a Primary Host Bridge (PHB) in a partitioned computer system is provided. An innovative PHB system is included which allows a PCI slot to be dynamically assigned to one or more partitions at a given time, allowing for more efficient allocation of system resources.

17 Claims, 12 Drawing Sheets

PCI SLOT CONTROL APPARATUS WITH DYNAMIC CONFIGURATION FOR PARTITIONED SYSTEMS

BACKGROUND OF THE INVENTION

1. Technical Field

The present invention generally relates to multiprocessor computer systems, and more particularly to resource allocation among processors in a partitioned multiprocessor system. Still more particularly, the preferred embodiments relate to a system for partitioning and allocating individual PCI slots in a multiprocessor computer system.

2. Description of the Related Art

Multiprocessor computer systems are well known in the art, and provide for increased processing capability by allowing processing tasks to be divided among several different system processors. In conventional systems, each processor is able to access all of the system resources; i.e., all of the system resources, such as memory and I/O devices, are shared between all of the system processors. Typically, some parts of a system resource may be partitioned between processors, e.g., while each processor will be able to access a shared memory, this memory is divided such that each processor has its own workspace.

More recently, symmetric multiprocessor (SMP) systems have been partitioned to behave as multiple independent computer systems. For example, a single system having eight processors might be configured to treat each of the eight processors (or multiple groups of one or more processors) as a separate system for processing purposes. Each of these "virtual" systems would have its own copy of the operating system, and may then be independently assigned tasks, or may operate together as a processing cluster, which provides for both high-speed processing and improved reliability. Typically, in a multiprocessor system, there is also a "service" processor, which manages the startup and operation of the overall system, including system configuration and data routing on shared buses and devices, to and from specific processors.

When several virtual systems, in a single multiprocessor system, are configured to operate as a cluster, software support must be provided to allow each cluster node to communicate with each other node in the multiprocessor to perform quorum negotiation and validation, send "heartbeats," and perform other quorum functions using any cluster communication technique. When this is accomplished, if one of the processors fails, which would cause that node to become unavailable to the cluster, the jobs assigned to that node can be reassigned among the remaining processors (nodes), using standard cluster techniques.

Typically, when a multiprocessor system is divided into multiple virtual systems, each of the virtual systems has its own copy of the operating system, and the same operating system is used for each virtual system. Since each processor is running the same operating system, it is relatively easy to provide for resource allocation among the processors.

Currently, however, there is a market requirement for the ability to run more than one operating system among the several virtual systems. For example, a user may wish to run a UNIX-variant operating system in one partition, and a "Windows" based operating system in a second partition. This need presents particular problems related to resource allocation; while division of memory between partitions in a multiprocessor system is generally supported in hardware, the allocation of other resources, such as Peripheral Component Interconnect (PCI) slots, is managed by the operating system. Since the multiple partitions may each be running a different operating system, there is a need for a means to allocate system resources which is not based on the operating system. In particular, there is a need for an operating system-independent solution which allows a system resource such as a PCI slot to be allocated among multiple partitions in a multiprocessor computer system.

SUMMARY OF THE INVENTION

It is therefore one object of the present invention to provide a system for the operation of a multiprocessor computer system.

It is another object of the present invention to provide a system for improved resource allocation within a multiprocessor computer system.

It is yet another object of the present invention to provide a system for partitioning and allocating individual PCI slots in a multiprocessor computer system.

The foregoing objects are achieved as is now described. A system for partitioning and allocating individual PCI slots within a Primary Host Bridge (PHB) in a partitioned computer system is provided. An innovative PHB system is included which allows a PCI slot to be dynamically assigned to one or more partitions at a given time, allowing for more efficient allocation of system resources.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
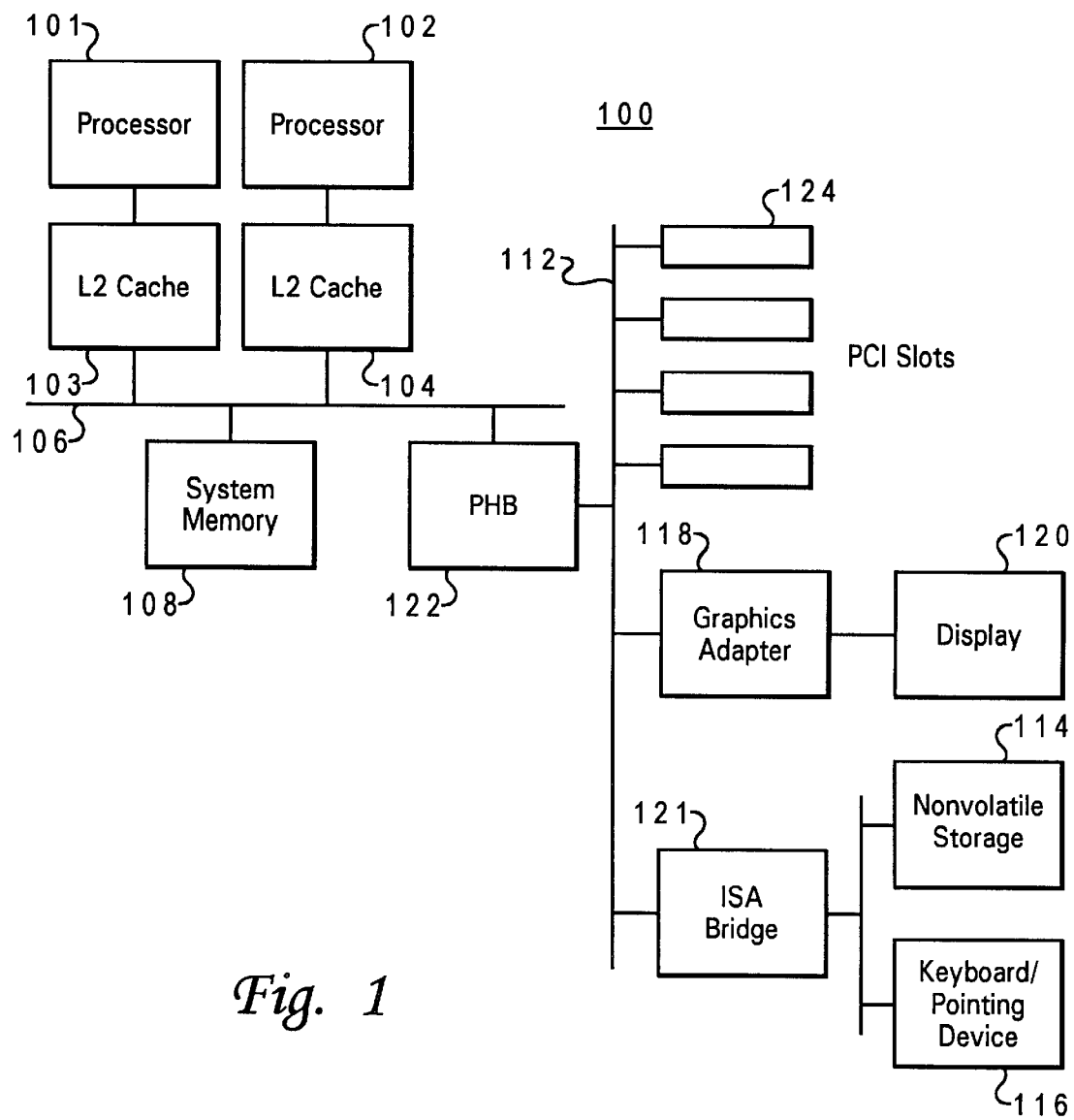
FIG. 1 is a block diagram of an exemplary computer system in accordance with a preferred embodiment of the present invention.

With reference now to the figures, and in particular with reference to FIG. 1, a block diagram of a data processing system in which a preferred embodiment of the present invention may be implemented is depicted. Data processing system 100 may be, for example, one of the desktop models of personal computers available from International Business Machines Corporation of Armonk, N.Y. Data processing system 100 includes processors 101 and 102, which in the exemplary embodiment are each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like, are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the exemplary partitioned computer systems below are provided solely as examples for the purposes of explanation and are not intended to imply architectural limitations.

Figures 2, 5:
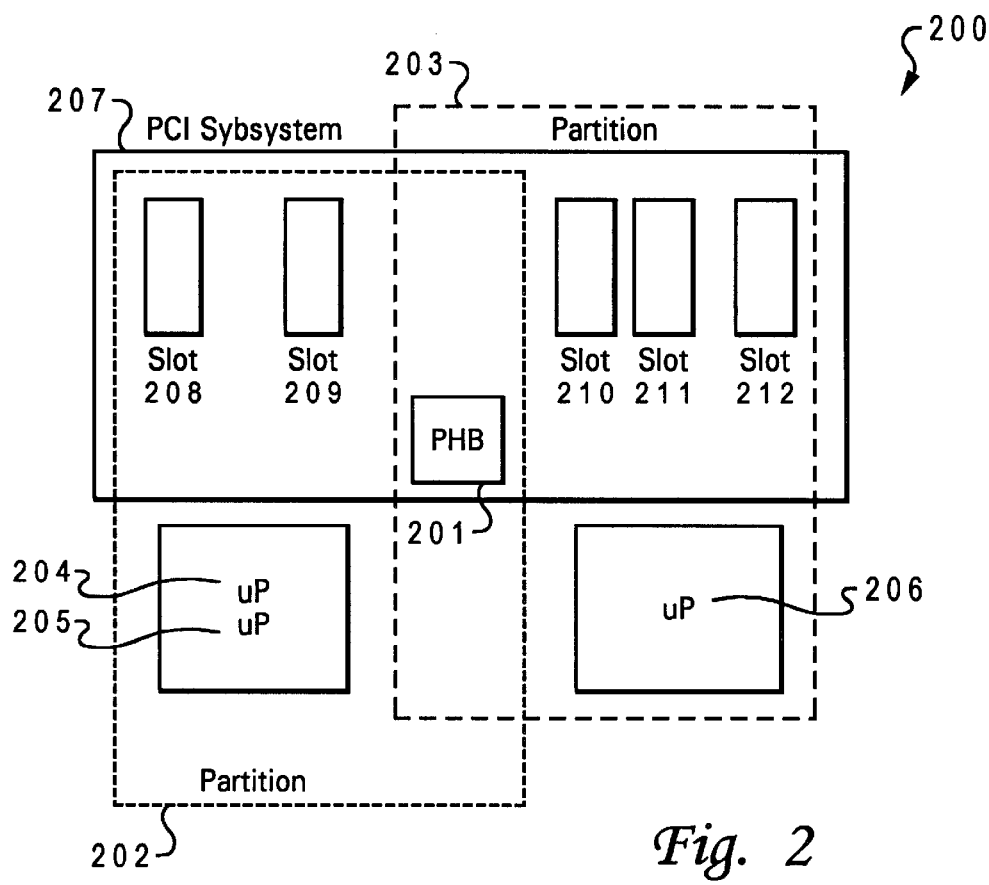
FIG. 2 depicts a high-level block diagram of a partitioned computer system in accordance with a preferred embodiment of the present invention.
FIG. 5 is a partition descriptor table in accordance with a preferred embodiment of the present invention.

Referring to FIG. 2, a high-level block diagram of a partitioned computer system in accordance with the preferred embodiment of the present invention is illustrated. In this figure, a computer system 200 having three microprocessors (uP) 204–206 and five PCI slots 208–212 is shown. The PCI subsystem 207 is comprised of the five PCI slots and the PCI Host Bridge (PHB) 201. In this figure, the system is divided into two partitions; Partition 207 includes microprocessors 204 and 205, PCI slots 208 and 209, and the PHB 201. Partition 203 includes microprocessor 206, PCI slots 210–212, and the PHB 201. Note that both partitions share the same PHB, which controls the partitioning of the PCI slots.

Figure 3:
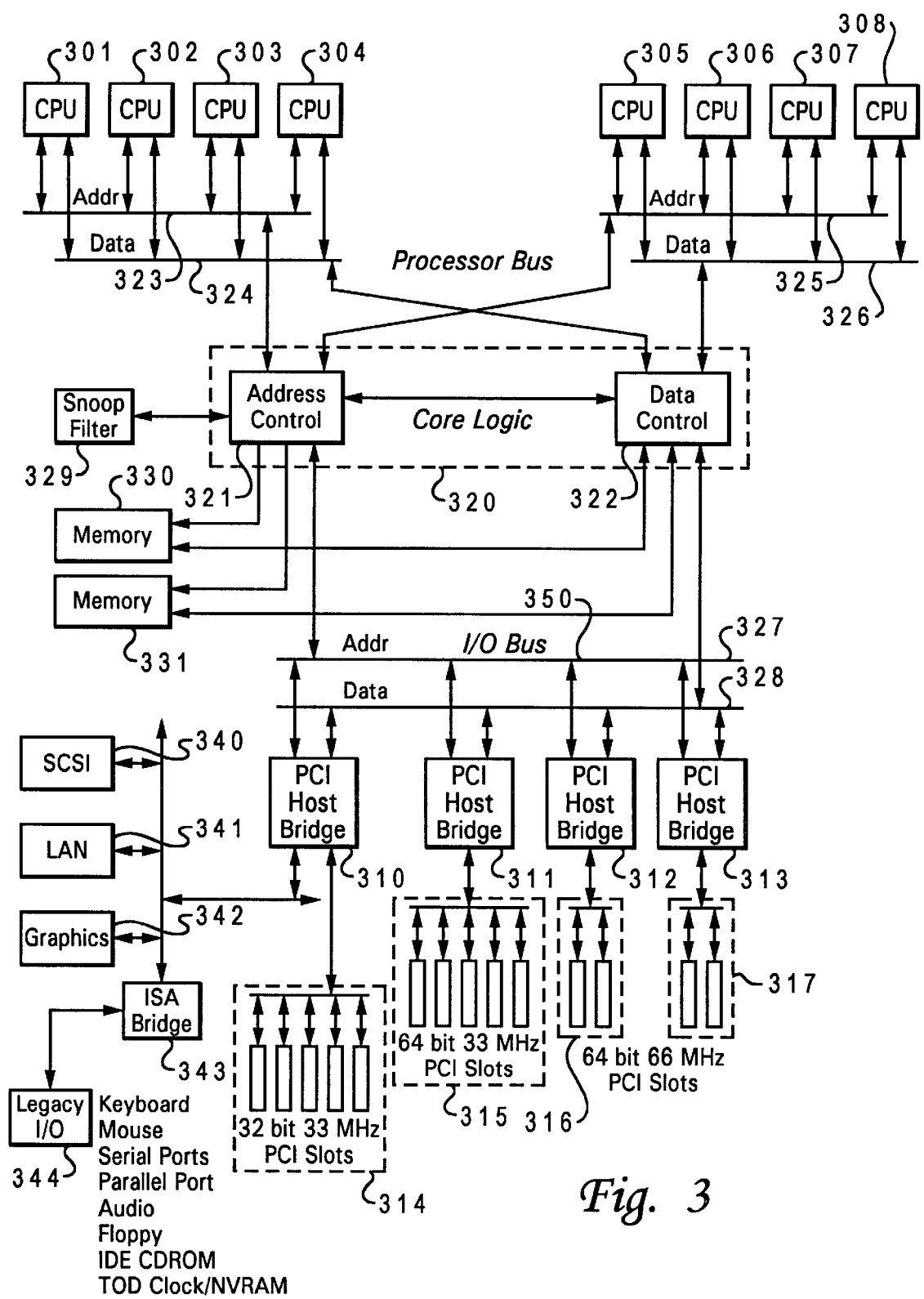
FIG. 3 is a more detailed block diagram of an eight-processor computer system in accordance with a preferred embodiment of the present invention.

With reference now to FIG. 3, a more detailed block diagram of an eight-processor partitionable computer system in accordance with the preferred embodiment of the present invention is depicted. In this diagram, eight processors 301–308 are shown connected in a symmetric multi-processor configuration, using a core chipset 320 which includes an address controller 321 and data controller 322, which is connected to the processors 301–308 via an address bus 323,325 and data bus 324,326 crossbar. In the preferred embodiment, these processors are Intel® Pentium II® class processors.

The core logic 320 interfaces each processor's front side bus to the memory subsystem 330,331 and to the I/O bus 350, which includes address bus 327 and data bus 328. The core logic also includes a snoop filter 329 that is designed to limit the amount of snoop transactions between the busses of any two processors. The central memory subsystem 330,331 is shown as two separate ports that can be accessed independently and simultaneously.

The I/O bus 350 provides the capability of attaching a high number of PCI slots 314–317, in order to support a scaleable high performance system. Up to four PCI Host Bridges 310–313 are supported, all interfacing to peer PCI bus segments.

In the preferred embodiment, all PCI slots have hot-plug capability. By integrating PCI Hot Plug control logic and Partition control logic in the PHBs 310–313, external isolation circuits, which are FETs in the preferred embodiment, can be used to isolate PCI slots on a transaction-by-transaction basis, in order to implement fine-grained I/O partitioning. Each partition can own from one to all of the system processors, and from none to all of the PCI slots.

Also shown in this figure are various I/O devices connected via PHB 310. These include SCSI controller 340, LAN connection 341, and graphics adapter 342. An ISA Bridge 343 is used to connect any legacy I/O devices 344, which can include a keyboard, mouse, serial ports, parallel ports, audio devices, a floppy drive, a CDROM, and a real-time clock, among others.

Figure 4:
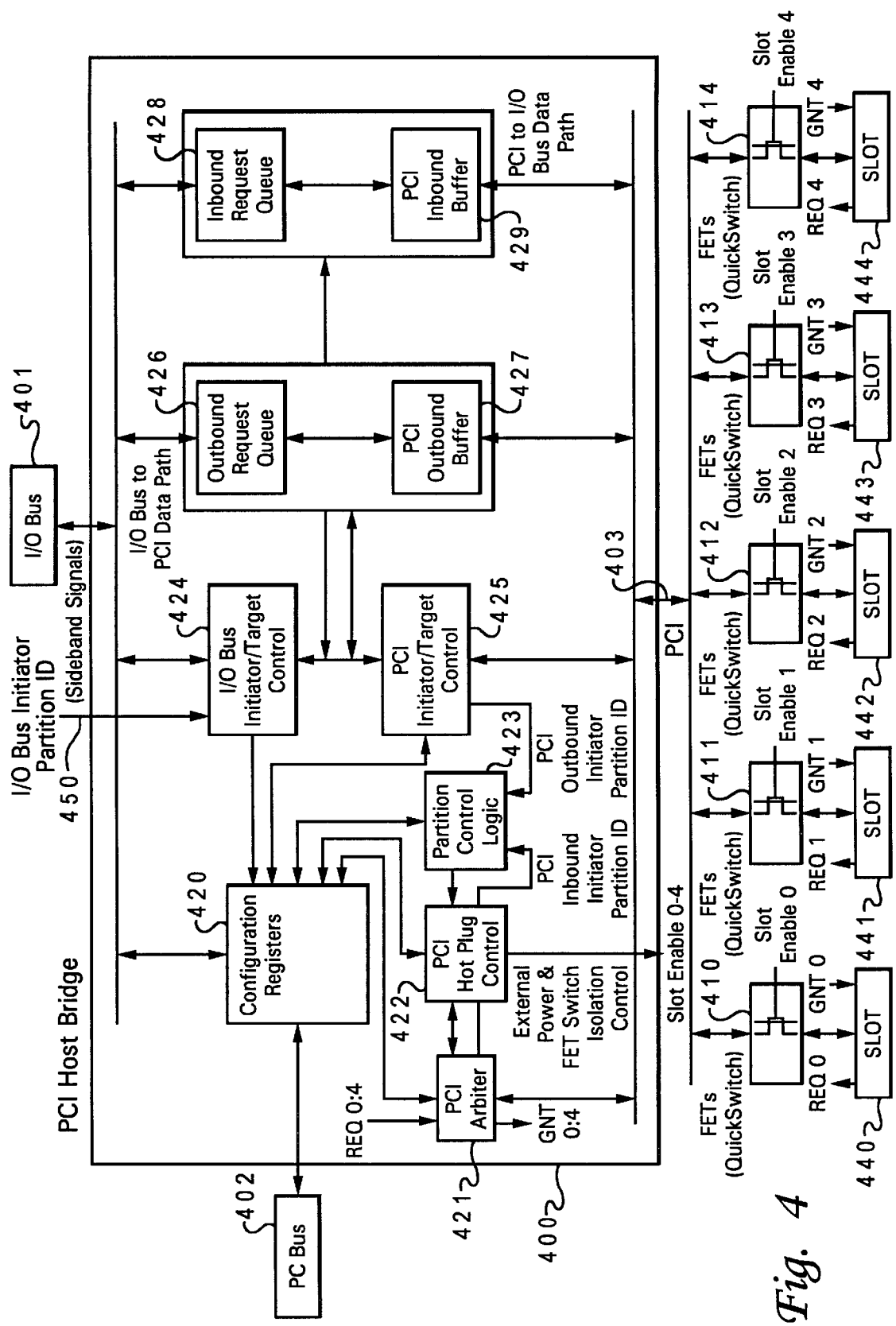
FIG. 4 depicts an improved PCI host bridge in accordance with a preferred embodiment of the present invention.
Figure 6:
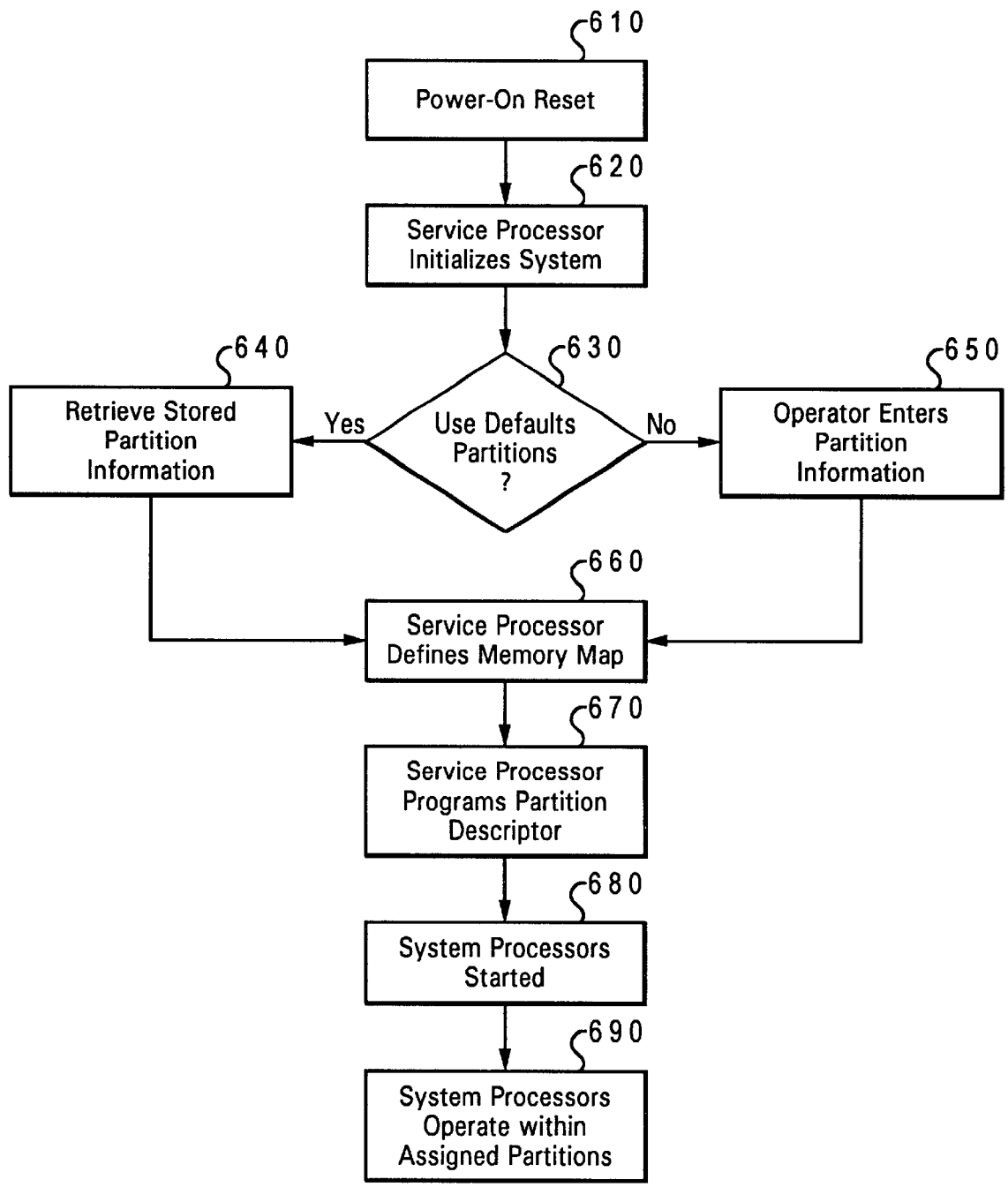
FIG. 6 is a flowchart of a system configuration process in accordance with a preferred embodiment of the present invention.

Referring to FIGS. 4 through 6, an improved PCI host bridge which provides the capability for slot-by-slot PCI partitioning in accordance with a preferred embodiment of the present invention is illustrated.

The PHB 400 provides separate request queues for outbound and inbound transactions, occurring simultaneously in either direction. Outbound transactions are initiated by an agent on the I/O bus 401, meaning either from the core logic (on behalf of one of the eight processors) or from another PHB forwarding a PCI memory transaction in a peer to peer application. Inbound transactions are initiated by an agent on the PCI bus 403, and directed towards system memory or to PCI memory on a peer PCI bus segment behind another PHB. Among other significant features, the PHB provides PCI arbitration for all initiator agents on its bus segment, hot plug PCI live insertion/removal support, and PCI slot partitioning.

The PHB implements posted writes and deferred response on outbound transactions initiated from the I/O bus and posted writes and delayed transactions on inbound transactions initiated from the PCI bus. Outbound memory writes are always posted, I/O writes are optionally posted or deferred, and both I/O and memory reads invoke a deferred response. The deferred response means that the transaction is removed from the processors in-order queue and placed in the deferred transaction queue, informing the processor that the transaction will be completed later. The PHB 400 will place the deferred transaction into its Outbound request queue 426, and when the read or write transaction completes on the PCI bus, the PHB will deliver a deferred reply to the initiating processor that the transaction has completed. Inbound memory writes are always posted, and memory reads are delayed. Delayed transactions on inbound reads means that the PHB will place the transaction into its PCI inbound buffer 429 and terminates the PCI initiated transaction with retry. The transaction is forwarded to the I/O bus 401 for read data and is placed in the Inbound Request queue 428 until the PCI transaction is retried. Once the transaction is retried the PHB completes the transaction with data.

I/O Bus Transactions

I/O Bus transactions initiated from one of the eight system processors will include the resource address (I/O or memory), the bus transaction type information, and sideband signals 450, called the Initiator Partition ID. These sideband signals are generated in the core logic based on which processor on the front side bus has initiated the transaction targeted for the PCI, and identifies to the PHB 400 the partition of which the initiator is a member. The front side bus (FSB) requesting agents use a distributed rotational priority bus arbitration scheme, which the core logic tracks to identify the initiator of every front side bus transaction. Each processor is assigned to a partition, defined by its Partition ID. The Partition ID is a new programmable register file incorporated in the core logic to support the generation of the sideband signals, which allow the present innovative partitioning techniques.

The Partition ID register file is configured at or before system initialization, and but may be changed during operation. The core logic will concatenate the generated Initiator Partition ID sideband signals along with the normal transaction onto the I/O Bus.

The PHB 400 receives the initiator Partition ID sideband signals with the I/O Bus transaction so as to determine what PCI Slot resource on its peer PCI bus segment should be enabled as a member of the targeted partition. The PHB includes as part of its PCI configuration space a PCI Slot Partition Descriptor, which includes the following programmable information, and is configured at or before system initialization.

Target Partition ID for the PCI Slot

The Target Partition ID supports from zero up to "n" partitions, "n" being the number of processors supported in the system. Each partition can be assigned as few no PCI slots or as many as all of them. A PCI slot and all of its target resources can be dynamically assigned to one or more partitions at any given time.

I/O and Memory Address Resources Decode Range Registers for the PCI Slot

The PHB uses these range registers to positively decode address resources claimed as a transaction target by the PCI slot. Each set of range registers would include a starting (base) address and an ending address. The I/O registers would support a minimum granularity of a 256-byte assignable range from the system address map, while the memory registers would support a minimum granularity of a 1 MB assignable range from the system address map. The number of non-contiguous address resources supported per PCI slot require a minimum of two I/O and two memory range register pairs. These registers are used for positive decoding purposes in order for the PHB to accept transactions initiated on the I/O bus, targeted for a particular I/O partition.

The following conditions must occur before the PHB will positively accept and respond as a target for I/O bus initiated outbound transactions. The following is referenced as a positive partition response (PPR) for Outbound transactions.

1. The I/O bus initiator Partition ID sidebands for the current transaction must match one of the target Partition ID's supported by the PHB; and 2. The I/O Bus transaction resource address (I/O or memory) must fall within the address range of a positive decoded resource target associated with the matching target Partition.

If one of the above conditions are not met for a positive partition response, the PHB will ignore the I/O Bus transaction, and assume that another PHB residing on the I/O Bus is the intended target. The core logic has the requirement to implement a bus transaction watchdog timer, for cases where the software or the hardware fails and it receives no response. In such a case as a bus transaction timeout, the core logic would forward a target abort hard fail response back to the initiating processor on the front side bus.

The following summarizes the different responses issued by the PHB for Outbound I/O Bus initiated transactions with a positive partition response, with reference to FIG. 4.

Outbound Memory Writes

Memory writes are posted in the Outbound Request Queue 426 and will then be moved to the PCI Outbound Buffer 427 once an entry is available. The transaction is removed from the Outbound Request Queue 426 at this time. The PCI Initiator/Target Control logic 425 requests ownership of the PCI bus when the transaction is placed in the PCI Outbound Buffer 427 via the PCI arbiter 421, and it also forwards the PCI Outbound Initiator Partition ID to the Partition Control Logic 423 for determination of what PCI slot resources are members of this partition and to have their corresponding PCI slot(s) enabled. All slots within a partition on the same PCI bus are enabled, since some devices may not be the intended target, but might require to snoop transactions for a particular device in-order to shadow its context. The PCI Partition Control logic 423 compares the PCI Outbound Initiator Partition ID against the target Partition ID for each PCI slot attached to the PHB's PCI peer bus segment. No cycles are wasted due to PCI arbitration; the arbiter grants the bus to the next owner during the current transaction, but it won't take ownership until it detects that the PCI bus is idle.

It should be noted that in the presently preferred embodiment, the PCI bus requires a minimum of one idle bus state between transactions, if it can guarantee that no contention occurs, so as to perform fast back-to-back transactions. There are two types of fast back-to-back transactions defined by the PCI Specification; the first is accomplished when a master's target for the current transaction is the same as the target of the immediately previous write transaction, the second requires that fast back-to-back capable targets guarantee no conflicts on target response signals. The PCI Specification requires that this second mechanism can only be supported via a configuration bit in the PCI Command register. The presently preferred embodiment requires that the second mechanism never be enabled, but can support the first mechanism, fast back-to-back transactions to the same device.

The PCI idle clock is required as a turnaround cycle to avoid contention when one PCI agent stops driving a signal and another agent begins driving the signal. The preferred embodiment requires an idle bus clock between every bus transaction, since FET isolation switches 410–414 are enabled/disabled during this turnaround cycle, in-order to implement fine grained PCI partitioning of slots on the same peer PCI bus segment. The Partition Control logic 423 indicates to the PCI Hot Plug control logic which PCI slots are to be enabled on a transaction-by-transaction basis. The FET switches are enabled during the idle turnaround clock cycle prior to the PHB taking ownership of the PCI bus. The PHB initiates the memory write transaction and the target device on the enabled PCI slot receives the data. If data is not delivered to the PCI target successfully, due to a PCI target abort, or parity error a Machine Check Abort (MCA) is generated.

Outbound I/O writes that are optionally posted have the same PHB response as outbound memory writes.

Outbound I/O Writes are Optionally Deferred

I/O writes are optionally deferred in the Outbound Request Queue 426 and will then be moved to the PCI Outbound Buffer 427 once an entry is available. The transaction is not removed from the Outbound Request Queue 426 at this time, but remains in the queue until the write is completed on the PCI bus 403 and the PHB 400 has delivered a deferred reply transaction on to the I/O Bus 401. The PCI Initiator/Target Control logic 425 requests ownership of the PCI bus 403 when the transaction is placed in the PCI Outbound Buffer 427 via the PCI arbiter 421, and it also forwards the PCI Outbound Initiator Partition ID to the Partition Control Logic 423 for determination of what PCI slot resources are members of this partition and to have their corresponding PCI slot(s) 440–444 enabled. The PCI Partition Control logic 423 compares the PCI Outbound Initiator Partition ID against the target Partition ID for each PCI slot 440–444 attached to the PHB's PCI peer bus segment. The PCI arbiter 421 grants the bus to the PHB and it takes ownership when it detects that the PCI bus is idle. The FET switches 410–414 are enabled during the idle turnaround clock cycle prior to the PHB 400 taking ownership of the PCI bus 403. The PHB initiates the I/O write transaction and the target device on the enabled PCI slot receives the data. If data is delivered to the PCI target successfully, normal completion with deferred reply transaction is returned. If data is not delivered to the PCI target successfully, due to a PCI target abort, or parity error, the deferred reply transaction's response phase will indicate a hard failure response and Machine Check Abort (MCA) is generated.

Outbound Memory or I/O Reads are Deferred

All read transactions are deferred in the Outbound Request Queue 426 and will then be moved to the PCI Outbound Buffer 427 once an entry is available. The transaction is not removed from the Outbound Request Queue 426 at this time, but remains in the queue until the read is completed on the PCI bus 403 and the PHB 400 has issued a deferred reply transaction with read data supplied onto the I/O Bus 401. The PCI Initiator/Target Control 425 logic requests ownership of the PCI bus 403 when the transaction is placed in the PCI Outbound Buffer 427 via the PCI arbiter 421, and it also forwards the PCI Outbound Initiator Partition ID to the Partition Control Logic 423 for determination of what PCI slot resources are members of this partition and to have their corresponding PCI slot(s) 440–444 enabled. The PCI Partition Control logic 423 compares the PCI Outbound Initiator Partition ID against the target Partition ID for each PCI slot 440–444 attached to the PHB's PCI peer bus segment. The PCI arbiter 421 grants the bus to the PHB and it takes ownership when it detects that the PCI bus is idle. The FET switches 410–414 are enabled during the idle turnaround clock cycle prior to the PHB taking ownership of the PCI bus. The PHB initiates the read transaction and the target device on the enabled PCI slot provides the data. If data is read from the PCI target successfully, normal completion with deferred reply transaction and read data is supplied in the data phase. If data is not read from the PCI target successfully, due to a PCI target abort, or parity error, the deferred reply transaction's response phase will indicate a hard failure response and Machine Check Abort (MCA) is generated.

Positive partition response (PPR) as a target for PCI bus initiated inbound transactions is significantly simpler than for Outbound transactions. The PCI bus initiator Partition ID is internally generated in the PHB's PCI Arbiter 421. The PCI Arbiter 421 has signals REQ0:4 and GNT0:4 connected point-to-point, i.e., without intermediate logic or isolation FETs 410–414, to PCI slots 440–444, respectively. REQ0:4 is the PCI bus request line for slots 440–444, respectively, and GNT0:4 is the PCI bus grant signal for these slots. These signals must not be bussed nor isolated, since the arbiter must be able to receive requests, grant ownership, and otherwise check the status of each slot even when a given slot is turned off and otherwise isolated from the PHB. The arbiter grants the bus to the next owner during the current transaction, but the PCI agent won't take ownership until it detects that the PCI bus is idle. The PCI bus Initiator Partition ID is generated simply based on which PCI Slot 440–444 is to be granted bus ownership and to which I/O partition it is a member of, based on the PCI Slot Partition Descriptor. The Partition Control logic 423 receives the PCI bus initiator Partition ID and compares it with all of the target Partition ID's supported by the PHB. All slots within a partition on the same PCI bus are enabled, in support of peer-to-peer transaction communications. The Partition Control logic 423 indicates to the PCI Hot Plug control logic which PCI slots are to be enabled. The FET switches 410–414 are enabled during the idle clock cycle prior to the PCI bus initiator taking ownership of the PCI bus.

Inbound Memory Writes are Posted

Memory writes are posted in the PCI Inbound Buffer 429 and will then be moved to the Inbound Request Queue 428 once an entry is available. The transaction is removed from the PCI Inbound Buffer 429 at this time. The I/O Bus or Initiator/Target Control 424 logic requests ownership of the I/O bus 401 when the transaction is placed in the Inbound Request Queue 428. The PHB initiates the memory read transaction on the I/O Bus, once bus ownership is granted, targeting either system memory or PCI memory on another PHB.

Inbound Memory Reads are Delayed

Memory reads, in this embodiment, are supported by the delayed transaction mechanism as defined by the PCI 2.1 specification, available from the PCI SIG, 2575 NE Kathryn St #17 Hillsboro, Oreg. 97124, and hereby incorporated by reference. The PHB will latch all PCI bus transaction information and place the inbound memory read into its PCI Inbound Buffer 429 and terminate the PCI transaction with retry. The transaction will then be moved to the Inbound Request Queue 428 once an entry is available, and the PCI transaction is removed from the PCI Inbound Buffer 429 at this time. The I/O Bus Initiator/Target Control logic 424 requests ownership of the I/O bus 401 when the transaction is placed in the Inbound Request Queue 428. The PHB initiates the memory read transaction on the I/O Bus targeted for either system memory or PCI memory, once it has been granted bus ownership. When the read data is returned, the PHB will maintain coherency of the data in the Inbound Request Queue 428. When the PCI bus agent again attempts to read the same memory location as the delayed transaction, the PHB moves the data into the PCI Inbound Buffer 429 so as to respond with data, and completes the delayed transaction on the PCI bus.

System Initialization and Configuration

A preferred method to initialize and configure the partitioned computer system is for the system's service processor to establish the initial partitioning. The Partition Descriptor is initially programmed during basic system configuration. In the preferred method, as shown in FIG. 6, after a power-on reset or hard boot (step 610), the service processor begins system initialization while the processors are still held in reset (stop 620). Among the tasks performed by the service processor is establishing the partitioning of the system. Depending on whether it is configured to use a default partitioning configuration (step 630), the service processor either uses stored information (step 640) or obtains the partitioning information interactively from an operator (step 650). The service processor establishes the basic memory map for the system (step 660) which includes the locations of the PHBs and programs the partitioning information to the partition descriptor register (step 670). Then, the system processors are started (step 680), and each processor then operates within its assigned partition (step 690), using its assigned PCI slots.

Partition Descriptor

The Partition Descriptor, as shown in FIG. 5, includes partition membership information. In this table, each slot entry contains single-bit flags to indicate which partitions to which that slot belongs. Each slot, shown here as 0:N, has an entry with a single bit for each partition in the system; the table size is dynamically allocated since the number of partitions is not fixed, but may be set at system boot. For each slot entry, a bit corresponding to each partition contains either a "0", indicating that the slot is not currently a member of that partition, or a "1", indicating that that slot is currently a member of that partition.

Figure 7A:
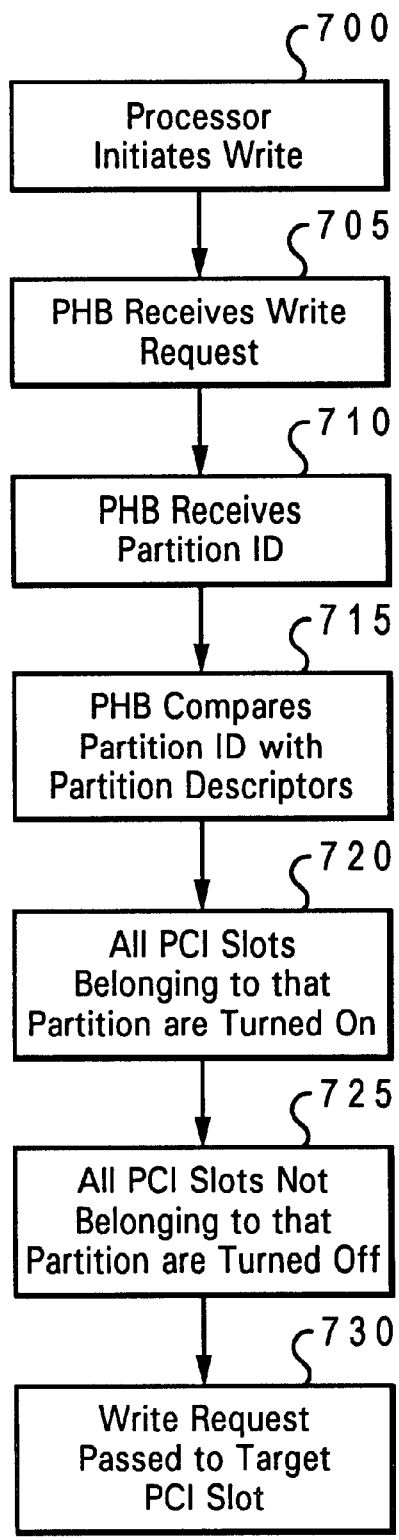
FIG. 7A shows a processor-initiated PCI write in accordance with a preferred embodiment of the present invention.
Figure 7B:
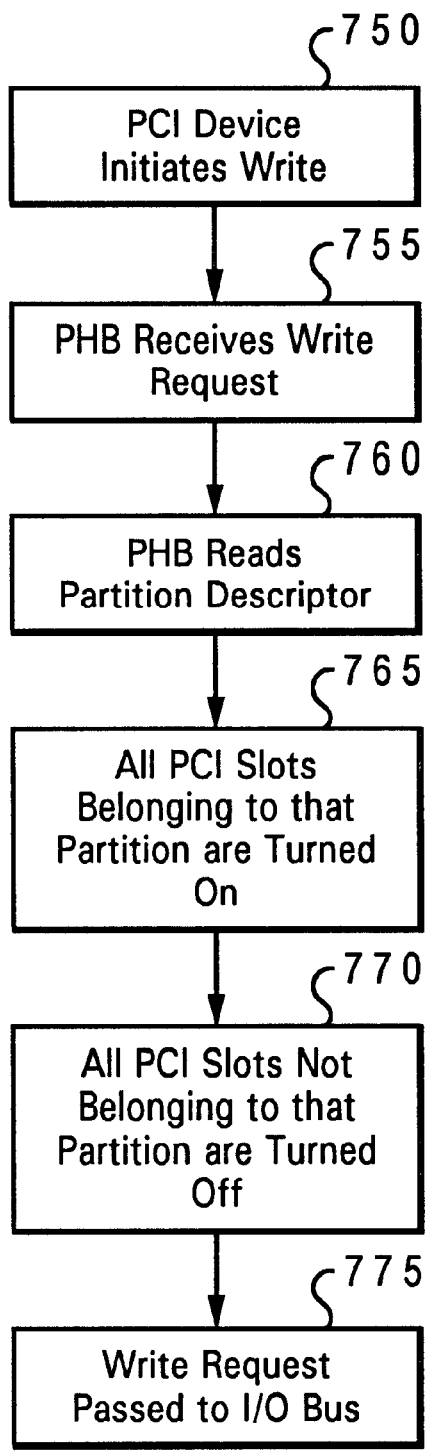
FIG. 7B shows a memory write initiated by a PCI device in accordance with a preferred embodiment of the present invention.

With reference now to FIGS. 7A and 7B, simplified flowcharts of sample PHB processes in accordance with a preferred embodiment of the present invention are shown (the more detailed processes are as described above). FIG. 7A shows a processor-initiated PCI write. After the processor initiates the write (step 700), the PHB receives the write request (step 705) and the initiating processor's partition identifier (step 710). The PHB then compares the partition identifier with the partition descriptors for each of its slots (step 715). The PHB turns on (enables) each PCI slot whose partition descriptor indicates that it belongs to the same partition as the initiating processor (step 720) and disables each PCI slot that does not belong to this partition (step 725). This is done, in the preferred embodiment, through the use of the FETs shown in FIG. 4. Finally, the write request is passed to the target PCI device (step 730).

FIG. 7B shows a memory write initiated by a PCI device. In this figure, after the PCI device initiates the write (step 750), the PHB receives the request (step 755) and reads that PCI slot's partition descriptor (step 760) to determine to which partition it belongs. After it has done so, the PHB enables all the PCI slots which belong to that partition (step 765) and disables all slots which do not belong to that partition (step 770). Finally, the write request is passed by the PHB to the I/O bus (step 775).

Dynamic Slot Assignment

The PCI slots can also be assigned dynamically, and can have multiple owners. The following description details the processes to dynamically assign and remove slots from a partition, both in the case of exclusive slot ownership and multiple ownership. Exclusive ownership is the case when a slot is owned by one and only one partition at a time but the slot can be dynamically moved to another partition during run-time. Multiple ownership is the case when a slot can be owned by more than one partition at a time and a slot can be assigned and unassigned from partition ownership during run-time.

Removal—Exclusive Ownership

Figure 8A:
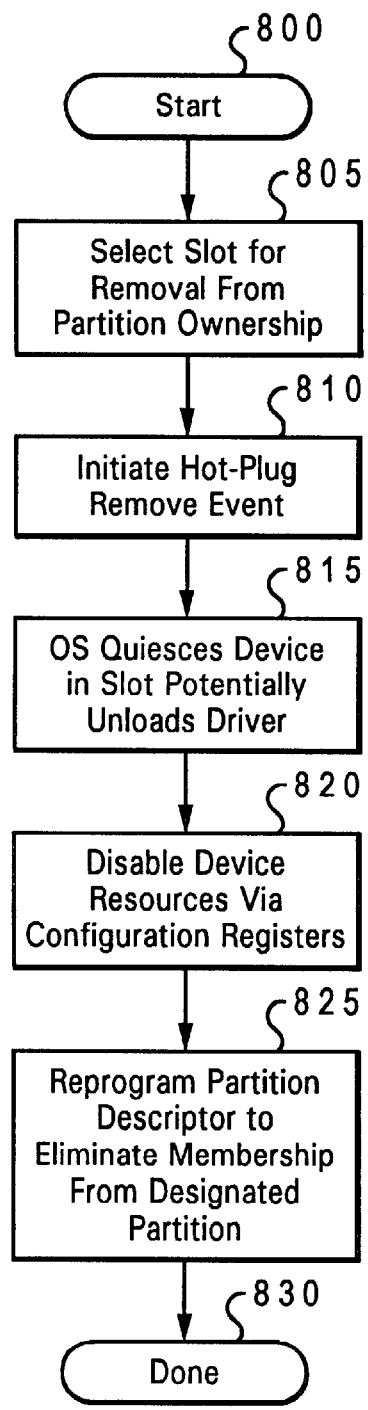
FIG. 8A shows an exclusive-ownership slot removal operation in accordance with a preferred embodiment of the present invention.

With reference now to FIG. 8A, when a partition decides that it no longer requires ownership of a particular slot (step 800), the operating system selects the slot for removal from that partition (step 805). The operating system then initiates a hot-plug event which signals the beginning of a change on the I/O bus (step 810). The operating system then quiesces the device in the slot to be removed from partition ownership (step 815). This step includes completing all pending work and preventing any new work from occurring to the device. Once the device in the slot has completed all pending activity, the operating system can choose to unload the corresponding device driver if that device driver is no longer needed by any other device. The operating system then disables the device in the slot via the PCI configuration registers (step 820). In this context, PCI disable means programming the PCI Command Register bits to prevent the device from participating in bus activity. Disabling the device is a safeguard to ensure that the device is inactive in the event the slot is reactivated sometime in the future. Finally, the operating system programs the corresponding slot partition descriptor to remove the partition's ownership of the slot (step 825). This completes the removal operation (step 830).

While this process is described in terms of actions taken by the operating system, these functions can be performed by any other software executing within the partition in question. This would include any appropriate software capable of orchestrating the operation and effecting the devices.

Addition—Exclusive Ownership

Figure 8B:
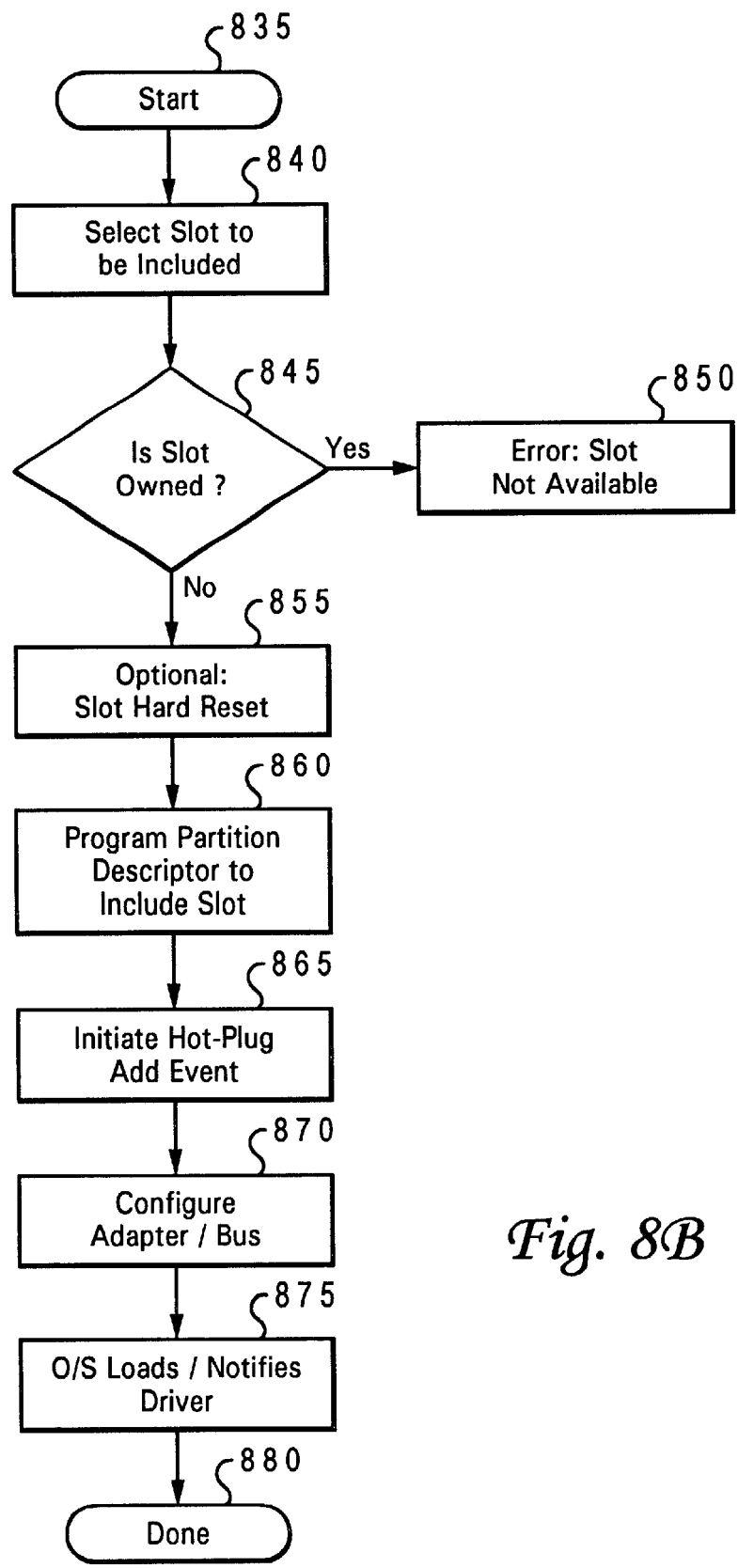
FIG. 8B shows an exclusive-ownership slot addition operation in accordance with a preferred embodiment of the present invention.

Referring now to FIG. 8B, a process is shown for adding an exclusively owned slot to a partition. When the partition requires a slot (step 835), a slot is selected to be included into the partition (step 840). The operating system checks to determine if the slot is currently owned or if the slot is unowned (step 845). This check is performed by reading the slot descriptor for the target slot. If the slot is owned then the slot is not available for inclusion in the partition so an error is indicated, such as "Error—slot not available" (step 850). If the slot is not currently owned (available) then the operating system may optionally choose to perform a hard reset on the slot (step 855). Performing a hard reset is a policy choice that the operating system can make to ensure that a device in the slot is reset and inactive. The operating system then programs the corresponding slot partition descriptor to include the slot in the partition (step 860). Once the slot is within the partition the device within the slot is visible to the operating system.

The operating system then initiates a hot plug event which signals the beginning of a change on the I/O bus (step 865). The operating system (or more specifically a PCI bus driver within the operating system) configures the adapter (device) and potentially the bus (step 870). In this context, the configuration process includes assigning non-conflicting (unique) resources (eg memory space) to the device. Configuring the bus means that the bus driver examines the entire bus to determine configuration parameters and perhaps reassigns resources within other devices to accommodate the addition of a new devices.

The device is now configured and on-line, the operating system loads the corresponding device driver or notifies an already loaded driver that the device has been added and is available (step 875). This completes the add operation (step 880).

Removal—Multi-Owner

Figure 9:
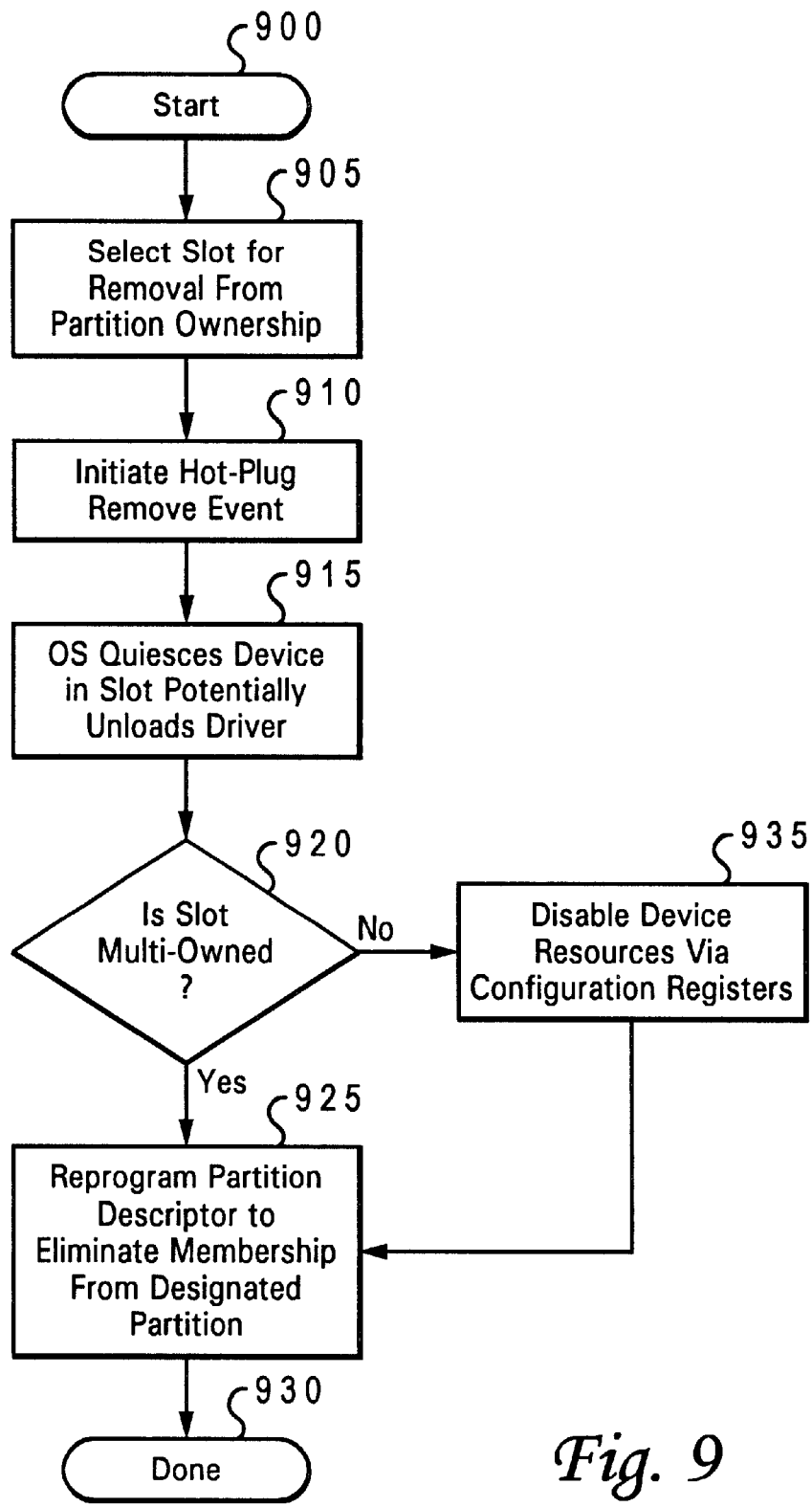
FIG. 9 shows a multiple-ownership slot removal operation in accordance with a preferred embodiment of the present invention.

With reference now to FIG. 9, when a partition decides that it no longer requires ownership of a particular slot (step 900), it designates that slot for removal from that partition (step 905). The operating system initiates a hot-plug event which signals the beginning of a change on the I/O bus (step 910). The operating system then quiesces the device in the slot to be removed from partition ownership (step 915). This step includes completing all pending work and preventing any new work from occurring to the device.

Once the device in the slot has completed all pending activity, the operating system can choose to unload the corresponding device driver if that device driver is no longer needed by any other device. A check is made to determine if the slot is multi-owned (step 920). If the slot is not multi-owned then the operating system disables the device in the slot via the PCI configuration registers (step 935). Here, "PCI disable" means programming the PCI Command Register bits to prevent the device from participating in bus activity. Disabling the device is a safeguard to ensure an inactive device in the event the slot is reactivated sometime in the future. If the slot is multi-owned then the operating system cannot disable the device since the device is also active within another partition.

Finally, the operating system programs the corresponding slot partition descriptor to remove the partition's ownership of the slot (step 925). This completes the removal operation (step 930).

Addition—Multi-Owner

Figure 10A:
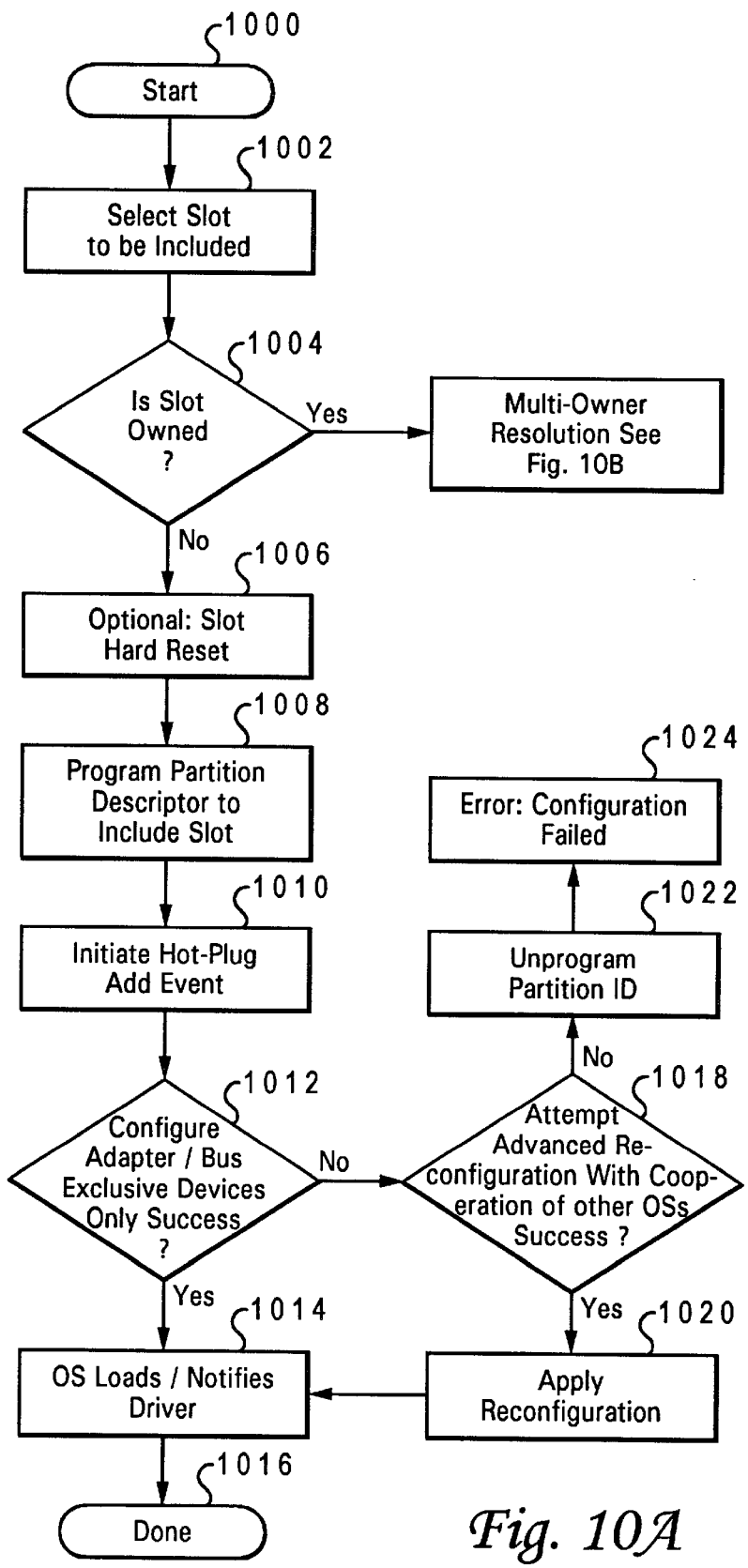
FIGS. 10A and 10B show a multiple-ownership slot addition operation in accordance with a preferred embodiment of the present invention.
Figure 10B:
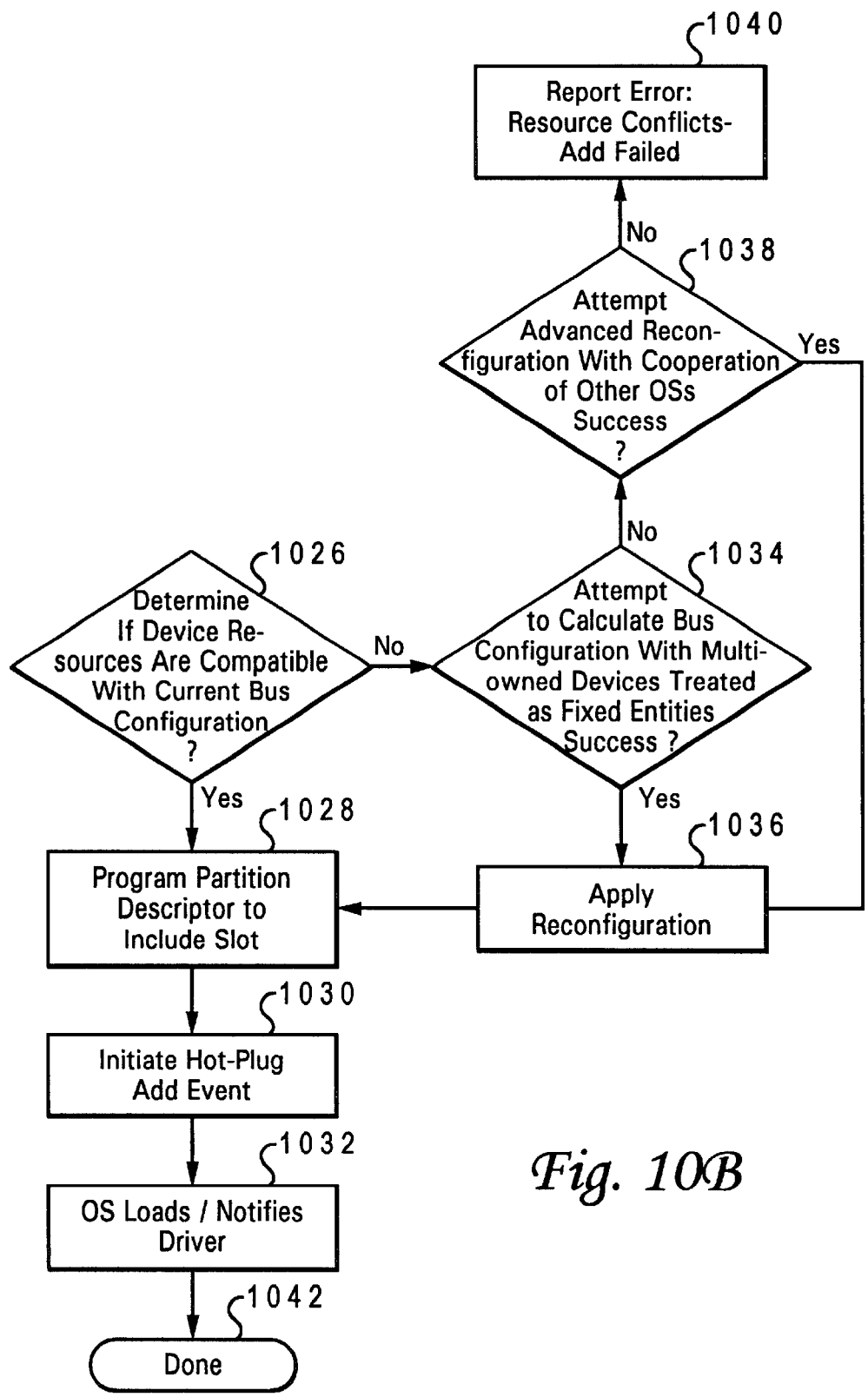

Referring now to FIGS. 10A and 10B, this is the most complex of cases since a currently active device with assigned resources (e.g., memory addresses) is to be introduced onto the bus (step 1000). Before an active device can be included within a partition's bus segment a non-conflicting configuration must be established. If a conflicting device were introduced onto the bus then errors will occur.

A slot is selected to be included into the partition (stop 1002). The operating system checks to determine if the slot is currently owned or if the slot is unowned (step 1004). This check is performed by reading the slot descriptor for the target slot. If the slot is owned then the process proceeds to Multi-Owner Resolution described below with reference to FIG. 10B.

If the slot is not currently owned (available) then the operating system may optionally choose to perform a hard reset on the slot (step 1006). Performing a hard reset is a policy choice that the operating system can make to ensure that the card is reset and inactive. The operating system then programs the corresponding slot partition descriptor to include the slot in the partition (step 1008). Once the slot is within the partition the device within the slot is visible to the operating system. The operating system then initiates a hot plug event which signals the beginning of a change on the I/O bus (step 1010). Because of the added complexity of multi-ownership (that is, devices which are active in both the current partition and other partitions), device and bus configuration must take into special account visible (slots this partition can access) multi-owned devices. The operating system attempts to configure the device knowing that changes can only be made to the configuration registers of exclusively owned devices (step 1012). Other devices are treated as fixed and unchangeable.

If a suitable configuration can be achieved then the device is now configured and on-line and the operating system loads the corresponding device driver or notifies an already loaded driver that the device has been added and is available (step 1014). This completes the add operation (step 1016).

If a suitable configuration was not achieved then in a simple case the operation would fail. However, in an advanced scenario a cooperative effort is made between all owning partitions (and the operating systems executing within them) to establish a suitable and mutually agreeable set of device configuration values (step 1018). If, in cooperating, the operating systems can reach a suitable set of device configuration values then these values are applied (step 1020). The operating system goes on to load or notify the driver as before (step 1014), and the operation completes (step 1016).

If no cooperative configuration can be achieved, then the operating system must remove the slot from the partition, by programming the partition descriptor (step 1022), and signal an error that the slot could not be added (step 1024).

The cooperative effort between operating systems to determine a suitable bus configuration requires that successive partitions de-assert device ownership and retry bus configuration until either an acceptable configuration is obtained or the de-assertion process is exhausted.

Referring now to FIG. 10B, the process reaches step 1026 in the event a slot is already owned by another partition, meaning that the device in that slot is already configured and operational.

The operating system checks to determine if the device within the slot to be added has a compatible set of configuration values (that is, non-conflicting resource assignments) (step 1026). This check is accomplished by either asking one of the owning partitions (or operating system executing therein) for the configuration data or by retrieving the configuration data from a central location such as the service processor. The selection is implementation dependent, and within the ability of one skilled in the art.

If the configuration values are compatible then the operating system then programs the corresponding slot partition descriptor to include the slot in the partition (step 1028). Once the slot is within the partition, any device within the slot is visible to the operating system. The operating system then initiates a hot plug event which signals the beginning of a change on the I/O bus (step 1030). The device is now configured and on-line, and the operating system loads the corresponding device driver or notifies an already loaded driver that the device has been added and is available (step 1032). This completes the add operation (step 1042).

If the device within the slot to be added does not have compatible configuration values then the operating system attempts to configure the bus "around" the multi-owned devices (step 1034). That is, recalculate the configuration keeping the multi-owned device configuration data as fixed and unchangeable. If this recalculation succeeds then the new configuration values are applied (step 1036) and the process resumes operation at step 1028. If the recalculation is not successful then the operation can simply fail.

In the advanced case, a "Cooperative Reconfiguration", similar to that in step 1018, is attempted (step 1038). If Cooperative Reconfiguration succeeds then the configuration is applied and the process resumes (step 1036).

If the Cooperative Process fails, then no suitable configuration is available, the slot addition fails and an error is reported accordingly (step 1040).

Note that in this complex case an active card is included in the partition only after a suitable configuration is determined. Programming the partition descriptor sooner in the process could result in resource conflicts between the devices on the bus.

Multi-Ownership Considerations

When a device has multiple owners at the physical level special programming considerations are required. For contrast, an example of sharing a device at a logical level is a shared network printer. In the shared printer case there is still only one physical owner of the printer; the system actually wired to the printer via a parallel port cable. It is this server system (the one cabled to the printer) that manages and controls the physical manipulation of the device.

Physical sharing, as opposed to logical sharing, requires additional coordination between owning operating systems.

The operating systems must ensure that access to the physically shared device occur in discrete units. Discrete operations will vary depending on the nature of the shared device. In the case of the printer example discussed previously, one discrete operation is a complete print job. An active print job must be allowed to complete before a second job is introduced to the device. If this discrete protocol is not followed, both print jobs will become corrupted. The operating systems can choose any standard means to ensure exclusive ownership during discrete operations including "token passing" or shared semaphores, which are considered within the abilities of one of skill in the art.

Modifications and Variations

There are, of course, many modifications and variations which can be made to the disclosed systems and methods without departing from the spirit and scope of the invention. For example, while the above description discusses the allocation of Peripheral Component Interconnect (PCI) connections in particular, these techniques, including those of exclusive partitioning and selective isolation of the slot connections, can be applied to a number of different computer architectures and systems.

Further, in alternative embodiments, a single PHB can be used for each slot. Thus, some of the more complicated configuration issues are not encountered because there is only one device (i.e. slot) per bus segment eliminating the need to configure around existing devices. Other variations in form and detail are certainly within the ability of one skilled in the art, and are expected to fall within the scope of the claims.

What is claimed is:

1. A computer system, comprising:
    a plurality of system processors, divided into a plurality of processing partitions, each partition having at least one system processor and a unique partition descriptor;
    at least one memory operatively connected to be written to and read from by said processors;
    an I/O controller connected to communicate with said system processors;
    a plurality of I/O connections, managed by said I/O controller, each I/O connection capable of being assigned to at least one said processing partition;
    a plurality of I/O devices, connected to said I/O connections;
    wherein said I/O controller only permits communications between system processors and I/O connections belonging to the same processing partition, and
    wherein said I/O connections can be dynamically assigned to or removed from said processing partitions.

2. The system of claim 1, wherein when a processor belonging to a given processing partition is communicating with an I/O device, all I/O connections not belonging to that partition are isolated from said processors.

3. The system of claim 1, wherein said isolation is accomplished using field-effect transistors.

4. The system of claim 1, wherein said I/O connections may simultaneously belong to multiple partitions.

5. A computer system, comprising:
    at least one system processor;
    a memory connected to be written to and read from said system processor;
    an I/O controller, connected to communicate with said memory and said processors; and
    at least one peripheral device, connected to communicate with said I/O controller via one of a plurality of device connections;
    wherein said system performs the steps of:
        receiving, in said I/O controller, a request to write to said peripheral device, from a system processor;
        receiving, in said I/O controller, a partition identifier corresponding to said system processor;
        turning on at least one of said plurality of connections, according to whether said connections belong to a group corresponding to said partition identifier; and
        passing said write request to said device,
    wherein said I/O connections can be dynamically assigned to or removed from said group corresponding to said partition identifier.

6. The system of claim 5, wherein said device connections are PCI slots.

7. The system of claim 5, wherein when said device connections are turned off, they are isolated from said I/O controller by a field-effect transistor.

8. The system of claim 5, wherein all said connections which do not belong to said group are turned off.

9. The system of claim 5, wherein said device connections may simultaneously belong to multiple said groups.

10. A computer system, comprising:
    a plurality of system processors;
    at least one memory connected to be written to and read from said system processors;
    an I/O controller, connected to communicate with said memory and said processors; and
    at least one peripheral device, connected to communicate with said I/O controller via one of a plurality of device connections;
    wherein said system performs the steps of:
        receiving, in said I/O controller, a request to write to memory from said device;
        reading, in said I/O controller, a partition descriptor corresponding to said device connection;
        turning on at least one of said device connections, according to whether said device connection belongs to a group corresponding to said partition descriptor;
        turning off all said device connections which do not belong to said group; and
        passing said write request from said device to said memory,
    wherein said device connections can be dynamically assigned to or removed from said group corresponding to said partition identifier.

11. The system of claim 10, wherein said device connection is a PCI slot.

12. The system of claim 10, wherein when said device connections are turned off, they are isolated from said I/O controller by a field-effect transistor.

13. The system of claim 10, wherein said device connections may simultaneously belong to multiple said groups.

14. A computer system, comprising:
    a plurality of system processors;
    at least one memory connected to be written to and read from said system processors;
    an I/O controller, connected to communicate with said memory and said processors; and
    at least one peripheral device, connected to communicate with said I/O controller via one of a plurality of device connections;
    wherein said system performs the steps of:
        assigning each of said plurality of system processors to a processing partition;
        assigning each of said processing partitions a respective partition identifier;

assigning each of said device connections to at least one of said processing partitions;

storing, in a memory, information identifying to which processing partition each device connection belongs; and passing communications between system processors and device connections belonging to the same processing partition, and not passing communications between system processors and device connections which do not belong to the same processing partition, wherein said device connections can be dynamically assigned to or removed from said processing partitions.

15. The system of claim 14, wherein when a system processor belonging to a given processing partition is communicating via a device connection belonging to the same processing partition, all device connections not belonging to that processing partition are turned off.

16. The system of claim 14, wherein when said device connections are turned off, they are isolated from said I/O controller by a field-effect transistor.

17. The system of claim 14, wherein said device connections can simultaneously belong to multiple processing partitions.

* * * * *